Figure 1:
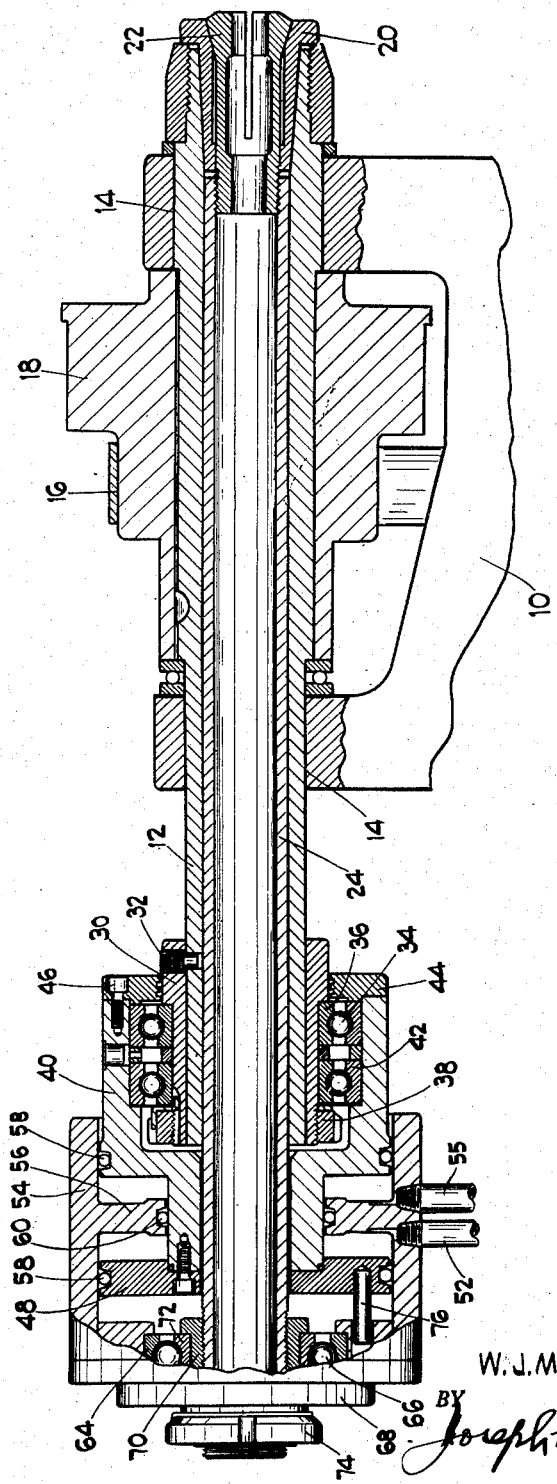

May 12, 1959     W. J. MANCHESTER     2,886,007
NON-ROTATING PNEUMATIC CHUCK ACTUATOR

Filed Jan. 30, 1958     2 Sheets-Sheet 1

INVENTOR.
W. J. MANCHESTER
BY
ATTORNEY

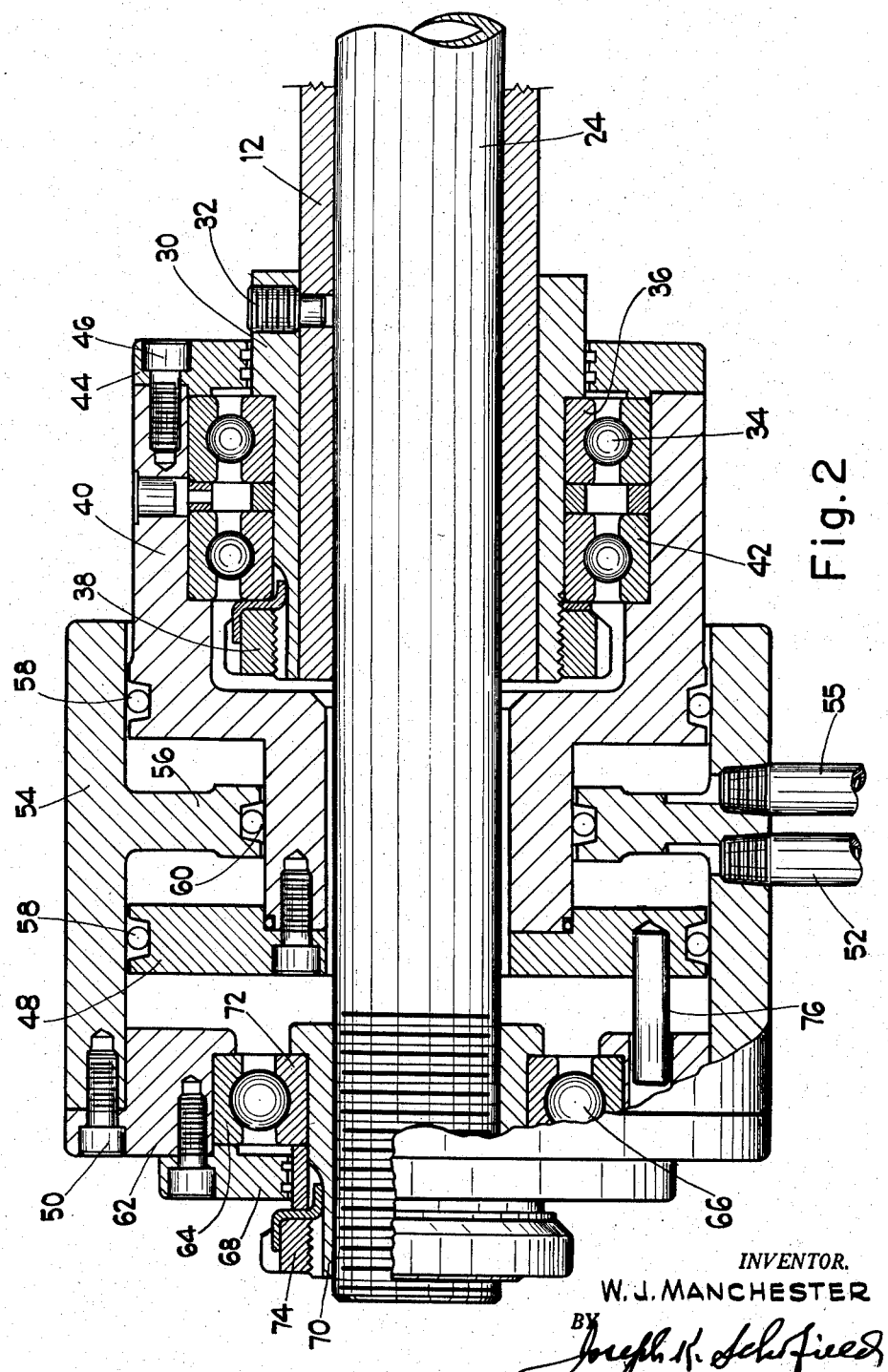

United States Patent Office 2,886,007
Patented May 12, 1959

2,886,007

NON-ROTATING PNEUMATIC CHUCK ACTUATOR

William J. Manchester, Rockfall, Conn., assignor to Power Grip, Incorporated, Rockfall, Conn., a corporation of Connecticut Application January 30, 1958, Serial No. 712,257

2 Claims. (Cl. 121—38)

This invention relates to lathes and more particularly to a pneumatic type chuck operating device in which a piston is movable relative to its cylinder, one of these members being mounted on the end of a work rotating spindle opposite the chuck and the other member being connected to the chuck by means of a tube extending within the spindle.

An object of importance of the invention is to provide an improved form of pneumatic chuck operating mechanism of the non-rotating type mounted at the end of the work spindle opposite the chuck and providing an opening or hole extending axially through the spindle and chuck actuating device to permit operations on bar stock.

A feature of importance of the invention is that the rotating members of the chuck actuating device are housed within the non-rotating members and rotatably connected thereto by means of suitable anti-friction bearings.

Another feature of importance of the invention is that non-rotating members comprise two separate members, one of which is mounted on the work spindle and the other is mounted on and surrounds a chuck actuating sleeve, air pressure being applied to either side of an internally extending diaphragm or wall to move one of these members relatively to and from the other.

With the above and other objects in view, the invention may include the features of construction and operation set forth in the following specification and illustrated in the accompanying drawings.

In the accompanying drawings annexed hereto and forming a part of this specification, I have shown the invention embodied in the work supporting and rotating means of a screw machine or turret lathe for bar stock but it will be understood that the invention can be otherwise embodied and that the drawings are not to be construed as defining or limiting the scope of the invention, the claims appended to this specification being relied upon for that purpose.

In the drawings:

Fig. 1 is a central longitudinal section through the work spindle of a lathe having a chuck at one end and pneumatic chuck operating means at its opposite end; and Fig. 2 is an enlarged central longitudinal section of the chuck actuating mechanism.

In the above mentioned drawings there has been shown but one embodiment of the invention which is now thought to be preferable, but it is to be understood that changes and modifications may be made within the scope of the appended claims without departing from the spirit of the invention.

Referring more in detail to the figures of the drawings and first to Fig. 1, it will be seen that a headstock 10 for a machine tool such as a screw machine, lathe or other metal cutting machine has a work supporting and rotating spindle 12 therein. This spindle 12 is supported on spaced bearings 14 and may be rotated by means of a belt 16 passing over a pulley 18 on the spindle 12. At one end of the spindle 12 is a work clamping chuck 20, the one shown being of the draw-in type collet chuck having spring jaw members 22. To actuate the chuck jaws which may be of any conventional type, a tube 24, attached at one end to the chuck jaw member 22 or their operating member, extends within the spindle 12. Axial movements of this tube 24 therefore will actuate the jaws 22 of the chuck 20 into and out of their work clamping position.

As the spindle 12 and chuck 20 form no part of the present invention, further description of them will not be necessary. It will suffice to state that the machine mounting the spindle 12 may be used for cutting operations on work pieces of various type either of an elongated bar type or individual castings clamped by radially movable jaws of a chuck operatively connected to the axially extending tube by appropriate connecting members.

At the end of the spindle 12 opposite the chuck 20 is a sleeve member 30 keyed to the spindle 12 by one or more studs 32 threaded through the sleeve, the inner ends of which extend into the spindle 12. On the sleeve 30 are mounted a pair of anti-friction bearings 34 the inner races 36 of which are disposed between an integral flange of the sleeve on one side and a nut 38 threaded on the sleeve 30 on the opposite side of the bearings.

Surrounding the sleeve member 30 is an annular member 40 supported on the outer races 42 of the anti-friction bearings 34. These outer races 42 are retained in position against a shoulder on the sleeve 30 by an inwardly extending flange member 44 secured to the end face of the annular member 40 by suitable means such as screws, one of which is shown at 46.

The opposite end of the annular member 40 is reduced in diameter and has a disk 48 attached to its end face by the screws as shown. By means of the disk 48 and reduced portion of the annular member 40 a recess is formed to the opposite ends of which air under pressure may be supplied through spaced conduits 52 and 55 presently to be more definitely referred to. Actuated axially by pressure admitted within the recess is an outer member 54 having an inwardly extending integral flange 56.

From the above description it will be seen that the recess formed in the annular member constitutes a cylinder within which the flange 56 on outer member 54 may be axially reciprocated by air admitted under pressure to the recess on either side of the flange.

The cylindrical portion of the outer member 54 by means of the sealing rings 58 forms a pressure tight connection with the outer cylindrical walls of the annular member and disks. This member 54 with its sealing rings and with a sealing ring 60 at the inner cylindrical surface of the flange 56 forms two pressure tight spaces for the admission of fluid under pressure.

At the extreme end of the outer member 54 is secured by means of screws 50, a closure member 62 housing the outer race 64 of an anti-friction bearing 66. This outer race 64 is secured in position between a shoulder and end plate 68 secured to the outer face of the end member 62. Within this end member 62 is a sleeve 70 provided with internal screw threads fitting over the threaded end of the tube 24. Member 70 houses the inner race 72 of the anti-friction bearing 66 between a shoulder and nut 74 threaded over the end of the sleeve member 70 as shown.

From the above description it will be seen that with air under pressure, admitted through conduit 55, the flange 56 and the outer member 54 of which it forms a part will be forced to the left and move the sleeve 70 and tube 24 adjustably connected to the sleeve by its threads in a direction to close the jaws 22 upon work extending within the chuck 20. These movements of the outer member 54 require similar movements of the conduits 55 which may be flexibly connected to its source of air under pressure (not shown). To open the chuck 20 the diaphragm 56 and its outer member 54 are moved to the right by the admission of air under pressure through conduit 52 to the recess to the left of flange 56.

By means of the conduits 52 and 55 and their connections (not shown) the outer member 54 is prevented from rotating with the members 30 and 70 mounted on the spindle 12. To prevent rotation of the members 40 and 48 a stud 76 is driven into the disk 48 and extends freely into a recess or opening within end member 62.

I claim as my invention:

1. An operating mechanism for a lathe chuck having an elongated actuating tube extending through the headstock spindle, a sleeve member secured to the spindle opposite the chuck, an annular member rotatably mounted on said sleeve, a disk mounted on the end of said annular member, an outer member having an inwardly extending integral flange operating within a recess formed between the annular member and disk, an end member secured to said outer member, and a sleeve within the end member rotatable therein, said sleeve being adjustably secured to said tube, whereby admission of air under pressure to said recess on opposite sides of said flange will force said tube axially to open or close said chuck.

2. An operating mechanism for a lathe chuck having an elongated actuating tube extending through the headstock spindle, a sleeve member secured to the end of the spindle opposite the chuck, an annular member surrounding said sleeve, anti-friction bearings between said sleeve and annular member, a disk mounted on the end of said annular member, an outer member having an inwardly extending flange operating within a recess formed between the annular member and disk, pressure tight seals between the outer member, its flange, the disk and annular member, an end member secured to said outer member, and a threaded sleeve within the end member, anti-friction bearings between said end member and threaded sleeve, said sleeve being adjustable axially relative to said tube, whereby admission of air under pressure to the recess on opposite sides of said flange will force said tube axially to open or close said chuck.

No references cited.